(12) United States Patent
Iwamoto et al.

(10) Patent No.: US 8,941,019 B2
(45) Date of Patent: Jan. 27, 2015

(54) ELECTRONIC APPARATUS AND ELECTRONIC COMPONENT HOUSING CASE

(71) Applicant: Panasonic Corporation, Kadoma-shi, Osaka (JP)

(72) Inventors: Akira Iwamoto, Osaka (JP); Hitoshi Nakatani, Osaka (JP); Takeshi Mori, Osaka (JP); Shun Shimazaki, Osaka (JP); Takahiro Tabata, Osaka (JP); Takaaki Asamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 90 days.

(21) Appl. No.: 13/763,103

(22) Filed: Feb. 8, 2013

(65) Prior Publication Data

US 2014/0060916 A1    Mar. 6, 2014

(30) Foreign Application Priority Data

Aug. 30, 2012   (JP) .................................. 2012-190596

(51) Int. Cl.
*H05K 7/14* (2006.01)
*G06F 1/18* (2006.01)

(52) U.S. Cl.
CPC ..................................... *G06F 1/181* (2013.01)
USPC ...................................... 174/535; 361/679.36

(58) Field of Classification Search
USPC ...................................... 361/679.36; 174/535
See application file for complete search history.

(56) References Cited

U.S. PATENT DOCUMENTS

| | | | | |
|---|---|---|---|---|
| 6,714,405 | B2* | 3/2004 | Jitsukawa | 361/679.36 |
| 7,106,583 | B2* | 9/2006 | Koh et al. | 361/679.36 |
| 2003/0056965 | A1* | 3/2003 | Tsuchiyama | 174/52.1 |
| 2004/0190193 | A1 | 9/2004 | Kuwajima | |
| 2005/0047077 | A1* | 3/2005 | Koh et al. | 361/685 |
| 2005/0211459 | A1* | 9/2005 | Ku et al. | 174/52.1 |
| 2007/0120999 | A1 | 5/2007 | Hara | |
| 2008/0158712 | A1 | 7/2008 | Nakatani | |
| 2009/0284910 | A1* | 11/2009 | Heo et al. | 361/679.36 |
| 2010/0020485 | A1* | 1/2010 | Huang | 361/679.36 |
| 2014/0063728 | A1* | 3/2014 | Iwamoto et al. | 361/679.36 |

FOREIGN PATENT DOCUMENTS

| | | |
|---|---|---|
| JP | 2004-315087 | 11/2004 |
| JP | 2007-073105 | 3/2007 |
| JP | 2008-291986 | 12/2008 |
| JP | 2009-264483 | 11/2009 |

* cited by examiner

*Primary Examiner* — Hung V Ngo
(74) *Attorney, Agent, or Firm* — Hamre, Schumann, Mueller & Larson, P.C.

(57) ABSTRACT

A slit opening 8 is formed on a lower principal surface 6a of a hard disk case 6, in the vicinity of the inner side of an angle part formed by a lower left lateral wall 6e and an opposing lower lateral wall 6c. A hard disk drive 7 is placed in the hard disk case 6. When the hard disk drive 7 is subjected to vibration caused by disturbance on the hard disk case 6, elastic deformation of an angle part 8a of the slit opening 8 occurs using an axis 8b as a center to reduce vibration of the hard disk drive 7. Thus, it is possible to reduce the thickness of the hard disk case 6. With such a configuration, a hard disk case that is for housing an electronic component and that can have a small thickness can be provided.

11 Claims, 13 Drawing Sheets

FIG. 3
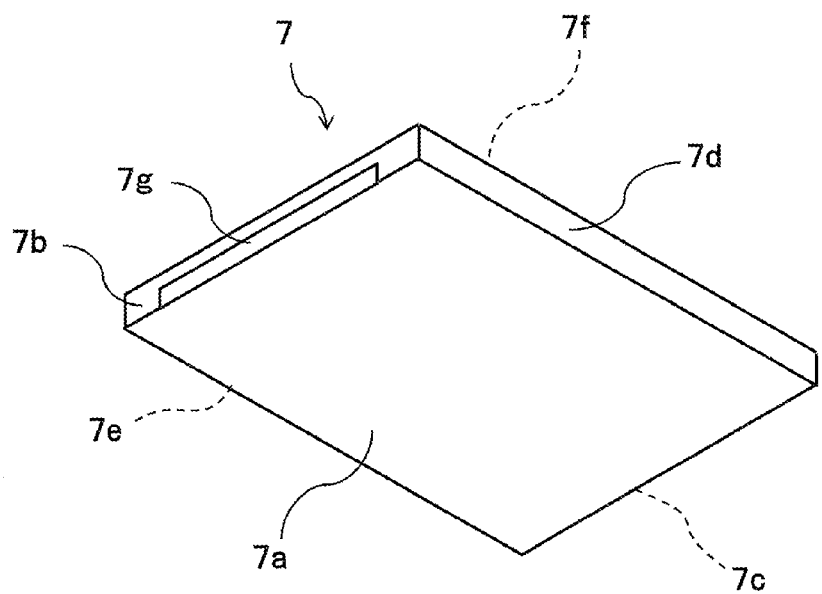
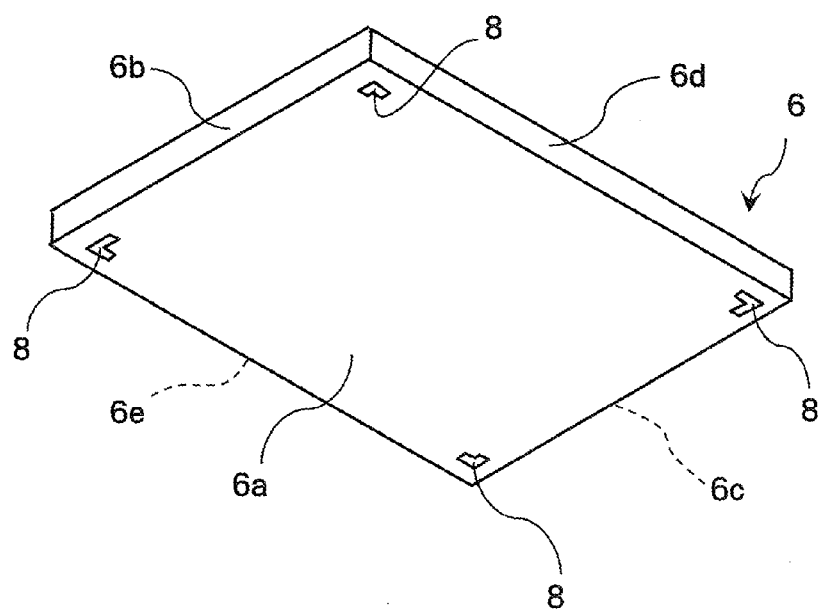

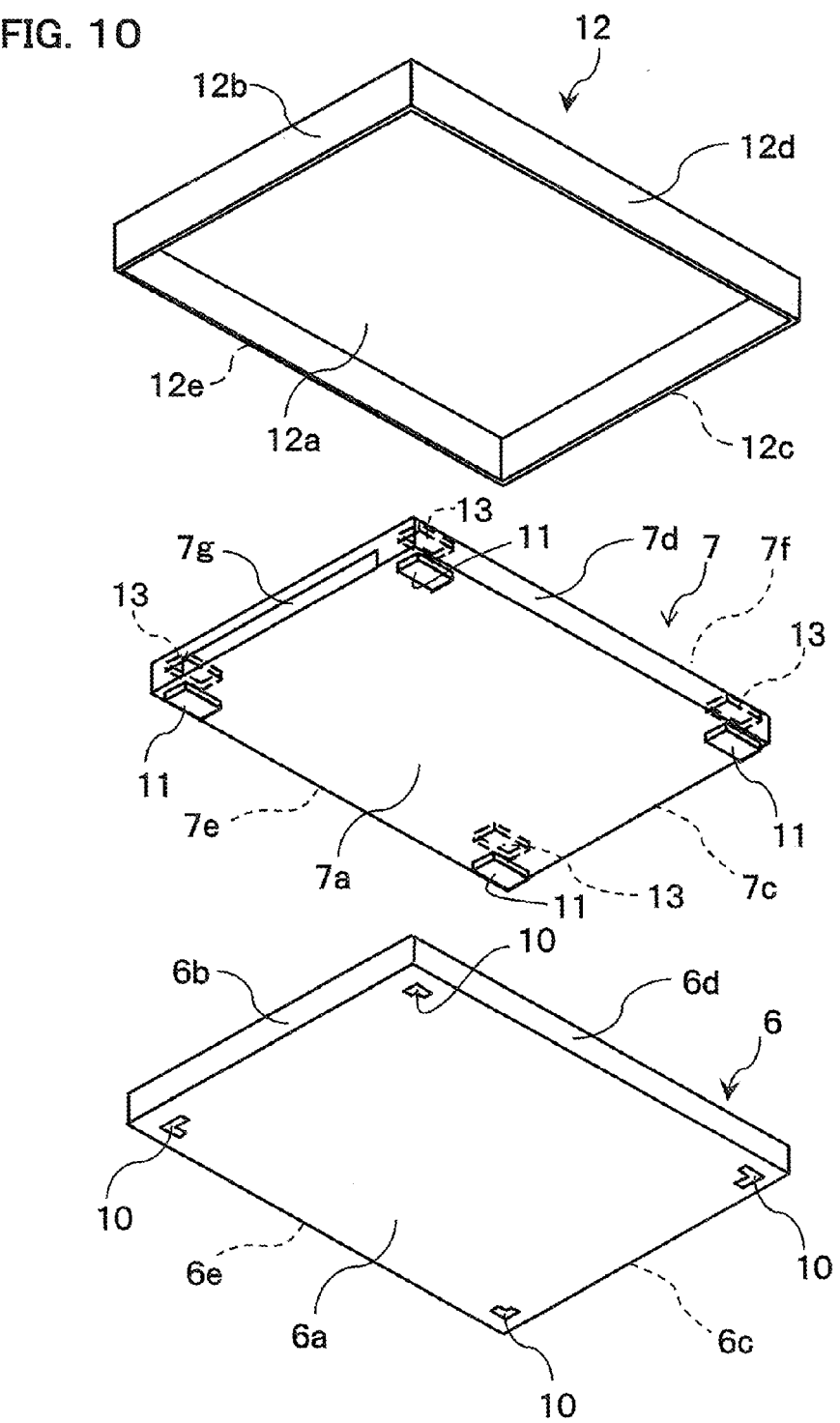

ELECTRONIC APPARATUS AND ELECTRONIC COMPONENT HOUSING CASE

BACKGROUND OF THE INVENTION

1. Field of the Invention

The present disclosure relates to an electronic apparatus having a case for housing an electronic component, and a case for housing the electronic component.

2. Description of the Background Art

Examples of electronic apparatuses with a case include Japanese Laid-Open Patent Publication No. 2007-073105. In Japanese Laid-Open Patent Publication No. 2007-073105, an outer case is built inside a housing of an electronic apparatus, a middle case is built inside the outer case, and a hard disk drive is built inside the middle case. The hard disk drive is biased to a neutral position within the outer case by biasing means (coil spring), and the outer case is filled with a liquid L. If an object hits the housing of the electronic apparatus and there is an impact thereto in the length direction, the middle case and the hard disk drive move, and the liquid L passes through a flow path formed between an outer circumferential surface of aperture sections included in the outer case and an inner circumferential surface of holes included in the middle case, and thereby flow path resistance is generated and the impact can be effectively reduced.

SUMMARY OF THE INVENTION

The present disclosure provides a case that is for housing an electronic component and that can have a small thickness, and an electronic apparatus including the case.

The electronic apparatus of the present disclosure is an electronic apparatus including an electronic component and a case housing the electronic component. On a surface of the case facing the electronic component, a slit opening confining within its boundary a corner of the electronic component is formed at a part of the surface where the corner makes contact thereto.

The electronic component housing case in the present disclosure is a case houses an electronic component. On a surface of the case facing the electronic component, a slit opening confining within its boundary a corner of the electronic component is formed at a part of the surface where the corner makes contact thereto.

BRIEF DESCRIPTION OF THE DRAWINGS

FIG. 3 is an exploded perspective view of a hard disk case and the HDD built in a PC;

FIG. 10 is an exploded perspective view of another hard disk case built in a PC.

DESCRIPTION OF THE PREFERRED EMBODIMENTS

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

In the following description, a notebook personal computer is used as one example of an electronic apparatus of the present disclosure, and a hard disk drive is used as one example of an electronic component of the present disclosure.

[Configuration of Notebook Personal Computer]

Figure 1:
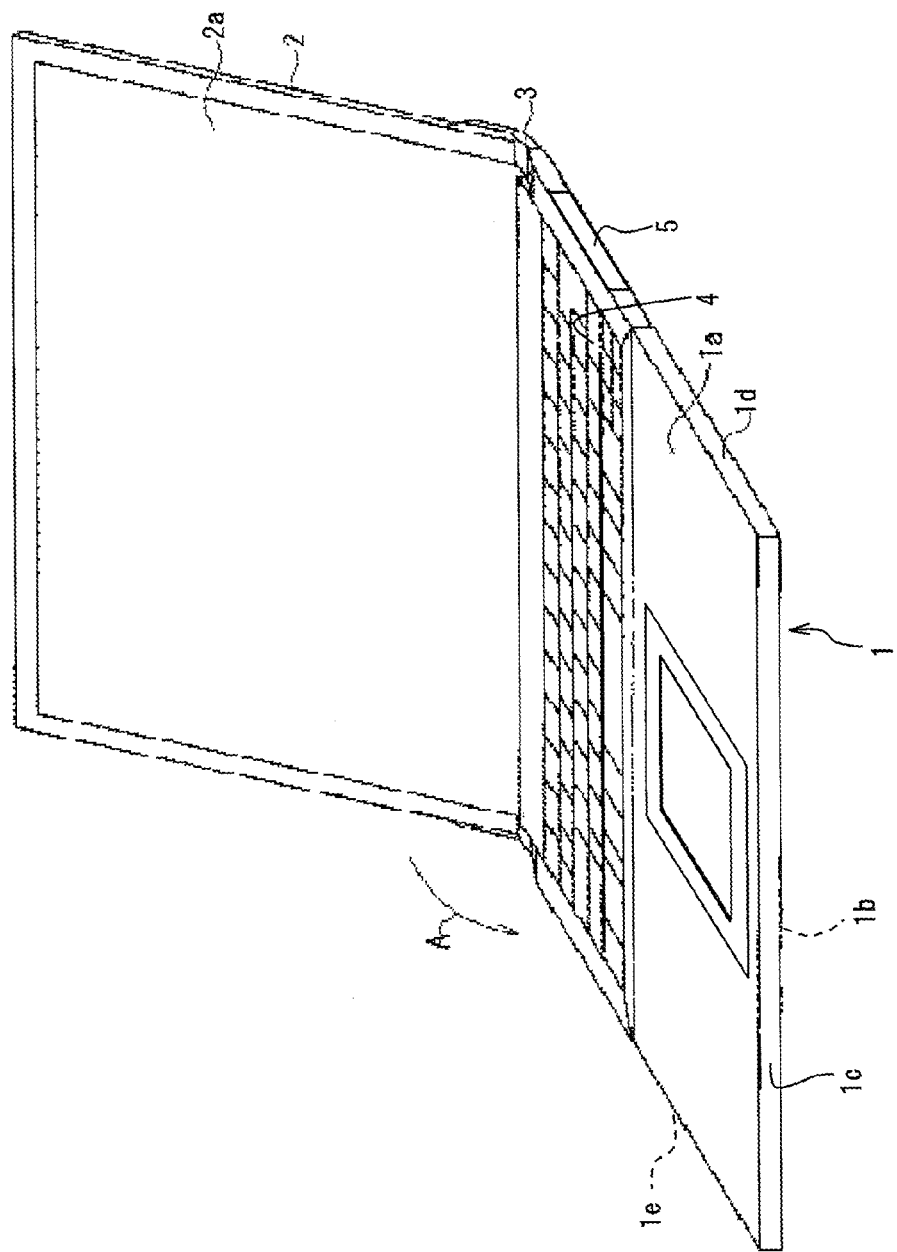
FIG. 1 is an exterior perspective view of a notebook personal computer (PC)

A notebook personal computer (hereinafter, abbreviated as PC) shown in FIG. 1 includes a hinge 3 supporting an operation housing 1 and a display housing 2 such that the PC can be opened and closed. The PC can be closed by rotating the display housing 2 in an arrow A direction so as to shut the display housing 2. FIG. 1 shows an operative state in which a user operates the PC.

The operation housing 1 has: an obverse surface 1*a* on which a keyboard 4 and the like are arranged; a reverse surface 1*b* opposing the obverse surface 1*a* through an interior space of the operation housing 1 having built therein a circuit board mounted with a central integrated circuit and various electronic components, a battery, etc.; a front surface 1*c* that faces an operator side when the PC is in the operative state; a right lateral surface 1*d* and a left lateral surface 1*e* which are respectively on the right side and the left side of an operator in the operative state; and a rear surface opposing the front surface 1*c* through the keyboard 4. Furthermore, the display housing 2 includes a display panel 2*a* that is to be viewed by the operator.

In addition to the central integrated circuit, the circuit board, and the battery, the interior space of the operation housing 1 includes a lid 5 for lidding a storing section for housing a hard disk drive (hereinafter, abbreviated as HDD) 7 that stores information data etc., sent and received to/from the PC. Although the lid 5 is arranged at the right lateral surface 1*d* in the present embodiment, it may be arranged at the left lateral surface 1*e* or the reverse surface 1*b*.

[1-1. Configuration of Hard Disk Drive]

Figure 2:
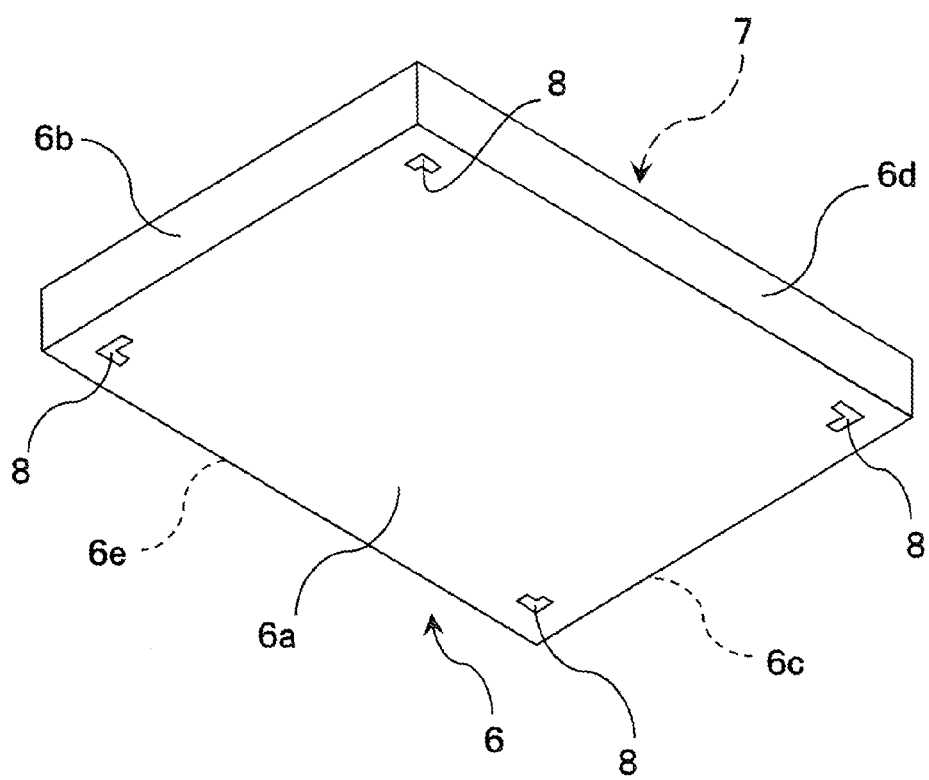
FIG. 2 is an exterior perspective view of a hard disk (HDD) built in a PC.

FIG. 2 is a perspective view of the HDD 7 housed in the storing section lidded by the lid 5. In addition, FIG. 3 is an exploded perspective view of a case 6 housing the HDD 7. The HDD 7 has a bottom surface 7*a*, an electrode-side lateral surface 7*b* where an electrode 7*g* is arranged, an opposing lower lateral surface 7*c* opposing the electrode-side lateral surface 7*b* through a read/write head and a storage disk built in the HDD 7, a right lateral surface 7*d* and a left lateral surface 7e which are respectively on the right side and the left side when viewed from the electrode-side lateral surface 7b, and a top surface 7f opposing the bottom surface 7a through the disk and read/write head.

In addition, the HDD 7 is attached firmly to a lower principal surface 6a of the hard disk case (hereinafter, abbreviated as case) 6 to be housed therein. The case 6 has the above described lower principal surface 6a, a below-electrode lateral wall 6b on a side of the electrode-side lateral surface 7b, an opposing lower lateral wall 6c on a side of an opposing lateral surface 7c, and a lower right lateral wall 6d and a lower left lateral wall 6e that are respectively on sides of the right lateral surface 7d and the left lateral surface 7e. It should be noted that, as a material for the case 6 of the present embodiment, a flexible acrylonitrile-styrene copolymer resin is used. In addition, at four locations in the vicinity of corner parts of the lower principal surface 6a of the case 6, slit openings 8 that penetrate the lower principal surface 6a are formed.

[1-2. Buffer Configuration of Hard Disk Drive]

Figure 4A:
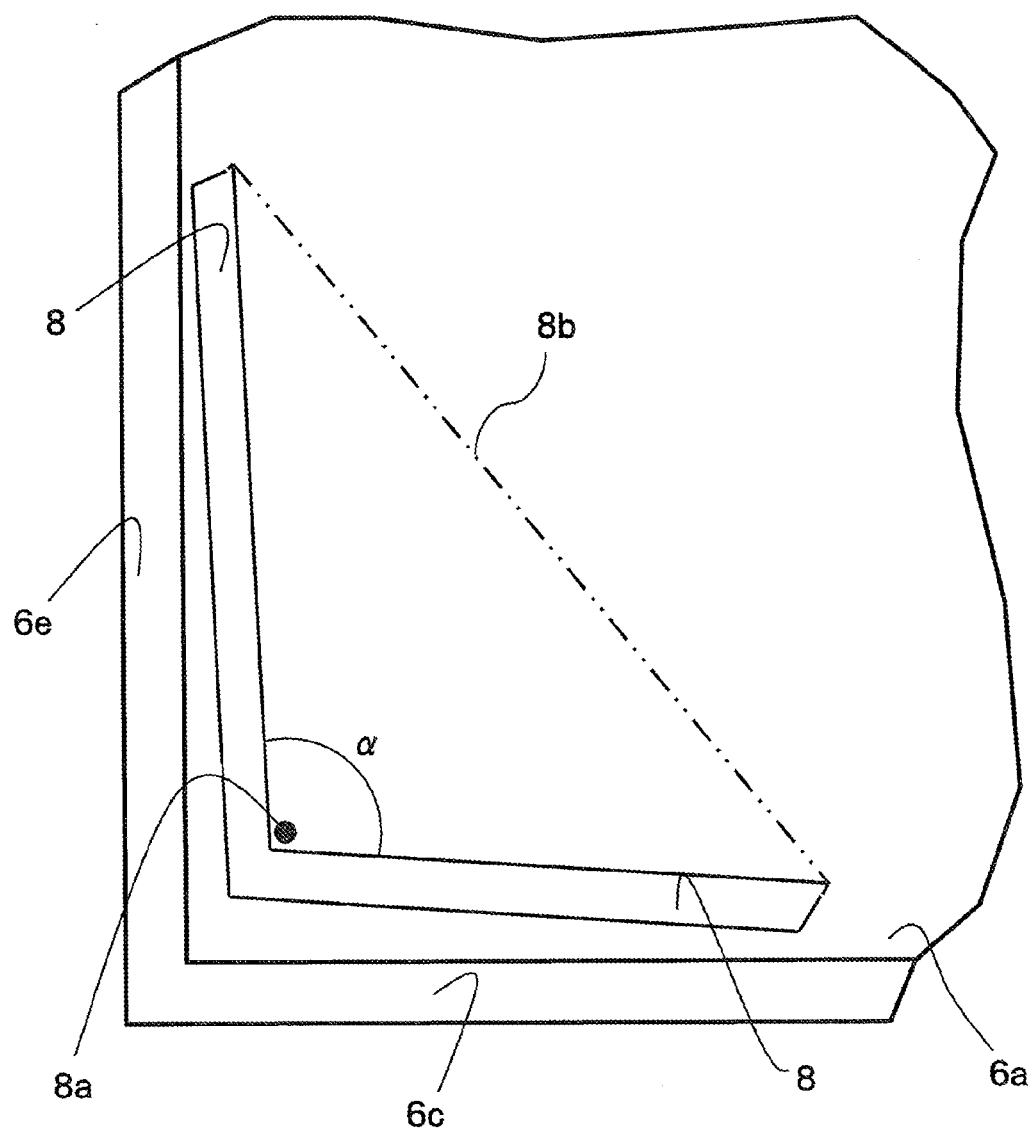
FIG. 4A is a relevant part plan view of the hard disk case built in a PC.

Next, details of the slit openings 8 provided on the lower principal surface 6a of the case 6 will be described with reference to FIG. 4A to FIG. 4C. FIG. 4A is a partial enlarged plan view of the lower principal surface 6a, and shows, in an enlarged manner, a corner part formed by the opposing lower lateral wall 6c and the lower left lateral wall 6e. One of the slit openings 8 is formed at this corner part such that one portion of the slit opening 8 is formed on a side of the opposing lower lateral wall 6c and another portion of the slit opening 8 is formed on a side of the lower left lateral wall 6e, and the two portion are connected at an angle part 8a having an angle α. The length of the slit openings 8 is smaller than the length of the outer circumference of the lower principal surface 6a, and the angle part 8a has elastic force since an axis 8b connecting notched portions of the slit openings 8 acts as a center. The case 6 used in the present embodiment has a thickness of 1 mm at the lower principal surface 6a, a length of 100 mm along the lower right lateral wall 6d and the lower left lateral wall 6e, and a length of 70 mm along the below-electrode lateral wall 6b and the opposing lower lateral wall 6c. The slit openings 8 shown next are formed at each of the corner parts of the case 6. With regard to the slit opening 8 in FIG. 4A, a central angle α at the angle part 8a is 100 degrees, a width of the slit opening 8 at the portion along the opposing lower lateral wall 6c and at the portion along the lower left lateral wall 6e is 1 mm, a length of the outer side of the slit opening 8 in a direction of the opposing lower lateral wall 6c is 20 mm from the corner, and a length of the outer side of the slit opening 8 in a direction of the lower left lateral wall 6e is 25 mm from the corner. The closest distance between the slit opening 8 and the opposing lower lateral wall 6c, and the closest distance between the slit opening 8 and the lower left lateral wall 6e are both 1 mm.

Figure 4B:
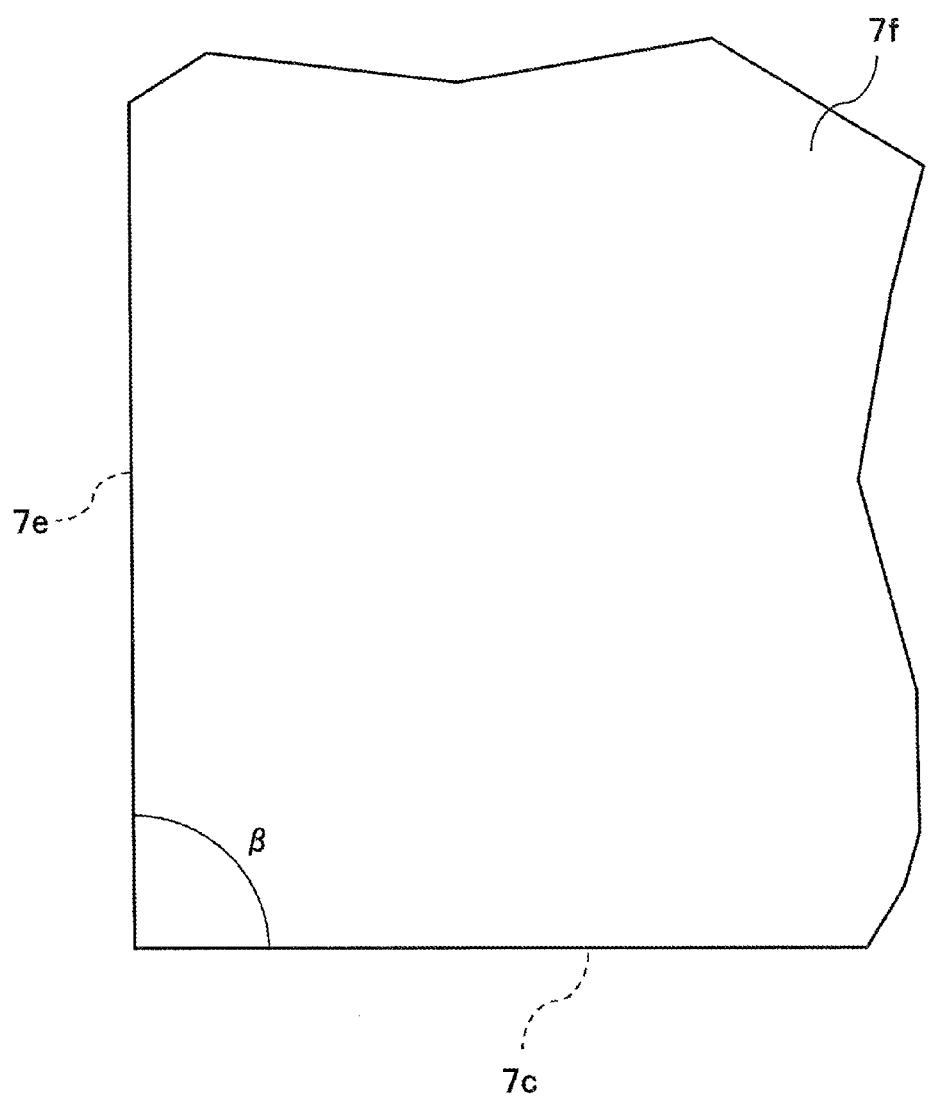
FIG. 4B is a relevant part plan view of the HDD.

The HDD 7 shown in a plan view from the top surface 7f in FIG. 4B is installed in the case 6 having formed thereon the slit openings 8. The outer shape of the HDD 7 is a rectangular parallelepiped, and an angle formed by the opposing lateral surface 7c and the left lateral surface 7e is 90 degrees. Furthermore, in the present embodiment, the length of the opposing lateral surface 7c and the electrode-side lateral surface 7b is 98 mm, and the length of the right lateral surface 7d and the left lateral surface 7e is 68 mm.

Figure 4C:
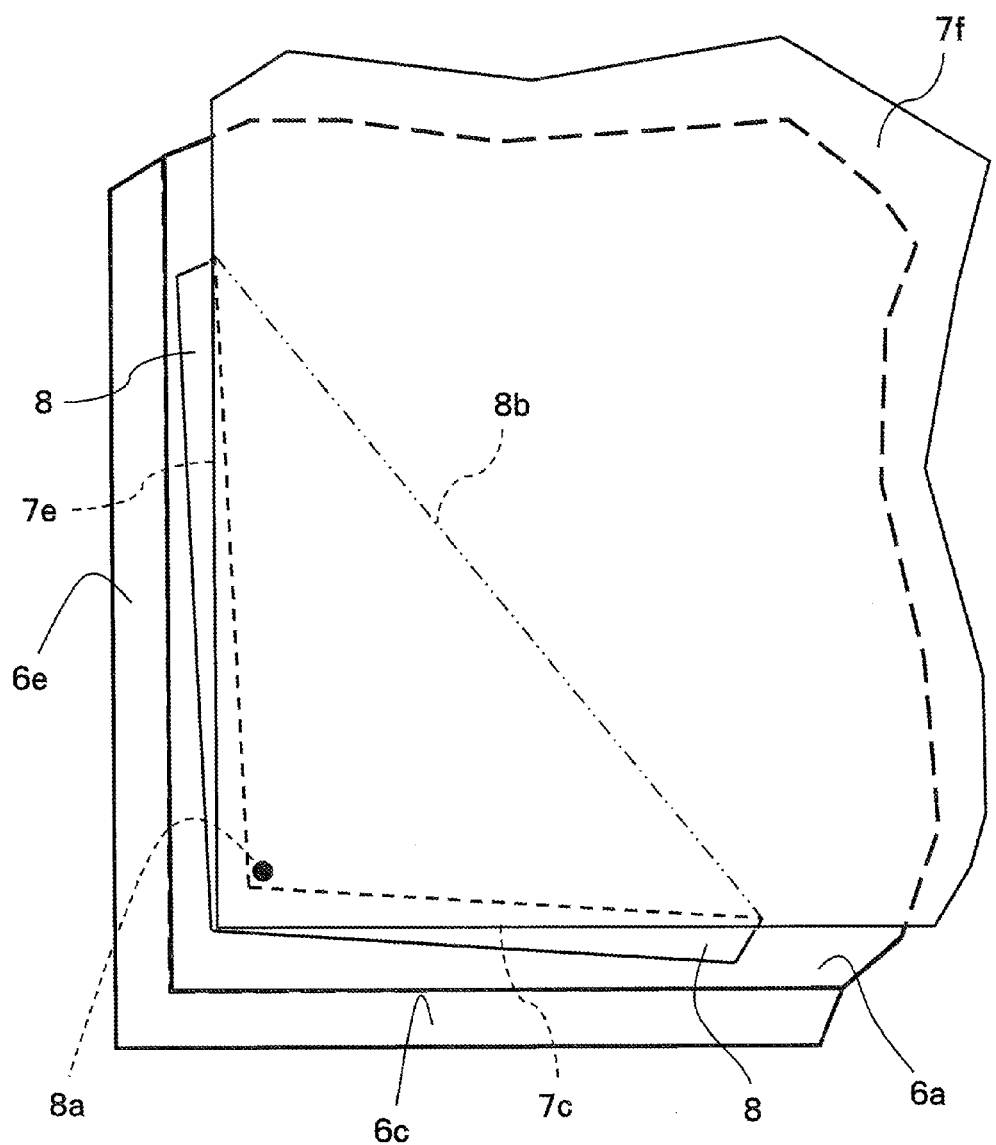
FIG. 4C is a relevant part plan view in which the HDD is housed in the hard disk case.

FIG. 4C is a plan view showing the HDD 7 housed in the case 6. When the case 6 housing the HDD 7 is subjected to external disturbance in a direction orthogonal to the lower principal surface 6a, vibration is generated in the obverse-reverse surface directions of the HDD 7 due to an impact generated by the external disturbance. Since the angle α of the slit openings 8 is formed to be equal to or larger than an angle β of the HDD 7, each of the angle parts included in the bottom surface 7a of the HDD 7 fits within voids of the slit openings 8. Thus, the angle part of the HDD 7 formed by the left lateral surface 7e and the opposing lateral surface 7c is supported by the angle part 8a of the slit openings 8 formed on the lower principal surface 6a. An impact to the HDD 7 caused by external disturbance is reduced by elastic deformation of the angle part 8a at the axis 8b in the obverse-reverse surface directions. Therefore, the thickness of the case 6 can be reduced while improving shock resistance of the PC having the case 6 built therein.

Figure 4D:
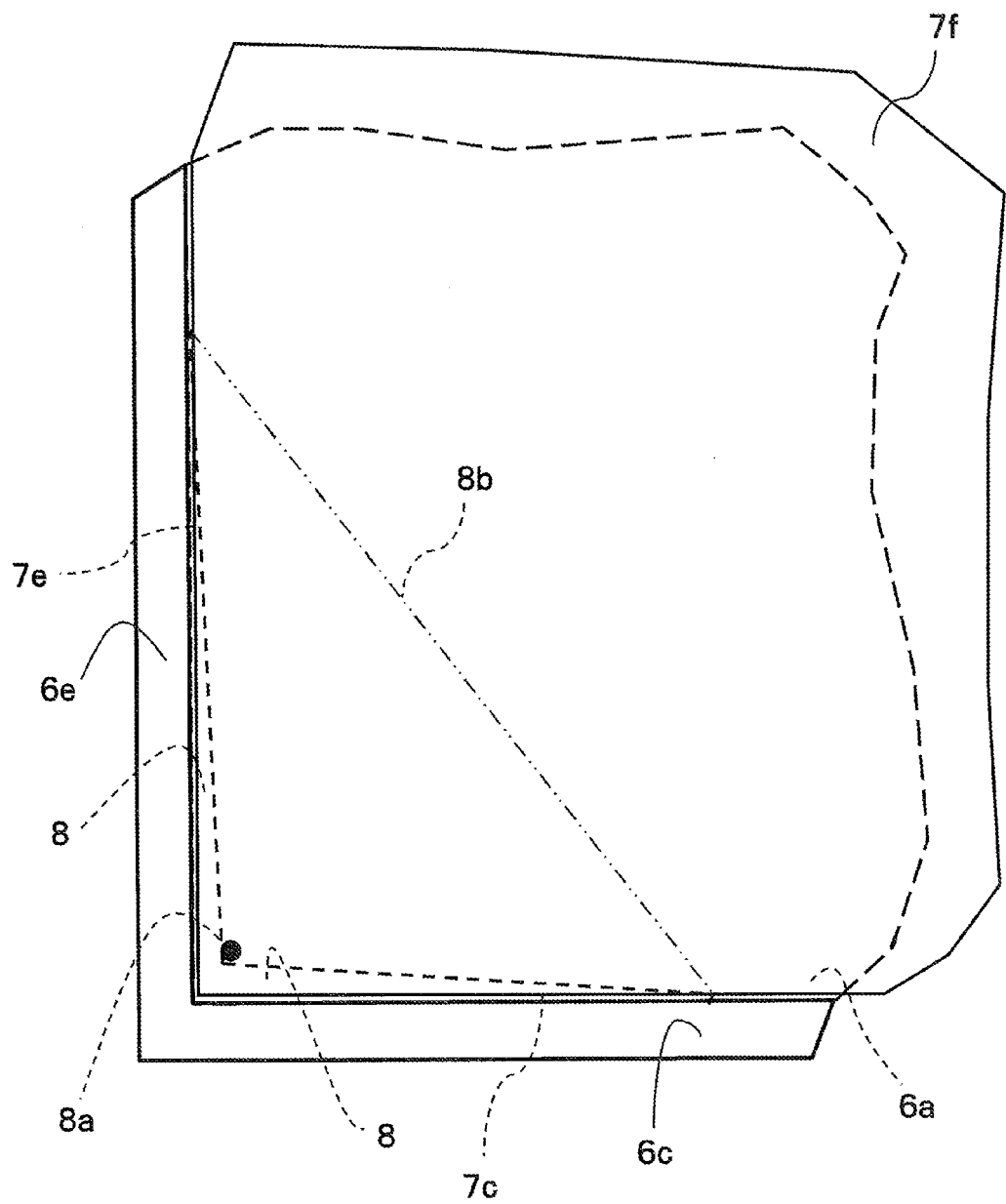
FIG. 4D is a relevant part plan view of another hard disk case for housing an HDD.

Although the slit openings 8 of the present embodiment are formed separate from adjacent lateral walls (e.g., the opposing lower lateral wall 6c and the lower left lateral wall 6e) by the closest distance (e.g., 1 mm), such a configuration is merely one example. As shown in FIG. 4D, it is possible to set the closest distance to zero and arrange the slit openings at boundary portions of the lower principal surface 6a and lateral walls. With this configuration, the area size of the lower principal surface 6a can be reduced, and the size the case 6 can be reduced.

Furthermore, although a configuration in which the HDD 7 is housed in the case 6 is described in the present embodiment, for example, lateral surface buffer materials may be disposed between the four lateral surfaces of the HDD and the four lateral walls of the case 6 for suppressing shaking of the HDD 7 in the case 6.

Furthermore, as shown in FIG. 4A, although the thickness of the lower principal surface 6a is set to 1 mm such that an impact generated by external disturbance is reduced through bending of the angle part 8a using the axis 8b as a center, such a configuration is merely one example. For example, since reducing the thickness improves impact-reducing performance, the thickness may be set as thin as 0.5 mm. With this, even though there is a trade-off between improvement of impact-reducing performance and the strength of the case 6 itself, it is possible to set the thickness so as to be able to maintain the strength of the case 6. Having a large length for the slit opening 8 included on the lower principal surface 6a along a lateral wall (e.g., the opposing lower lateral wall 6c) improves the impact-reducing performance. However, when the length of the slit opening 8 is too large, the distance from an adjacent slit opening 8 may become too small and strength of the lower principal surface 6a at a location between adjacent slit openings 8 may become insufficient. Therefore, the length of the slit opening 8 is set in accordance with the length of the corresponding case 6.

[1-3. Buffer Configuration of Hard Disk Drive]

Figure 5:
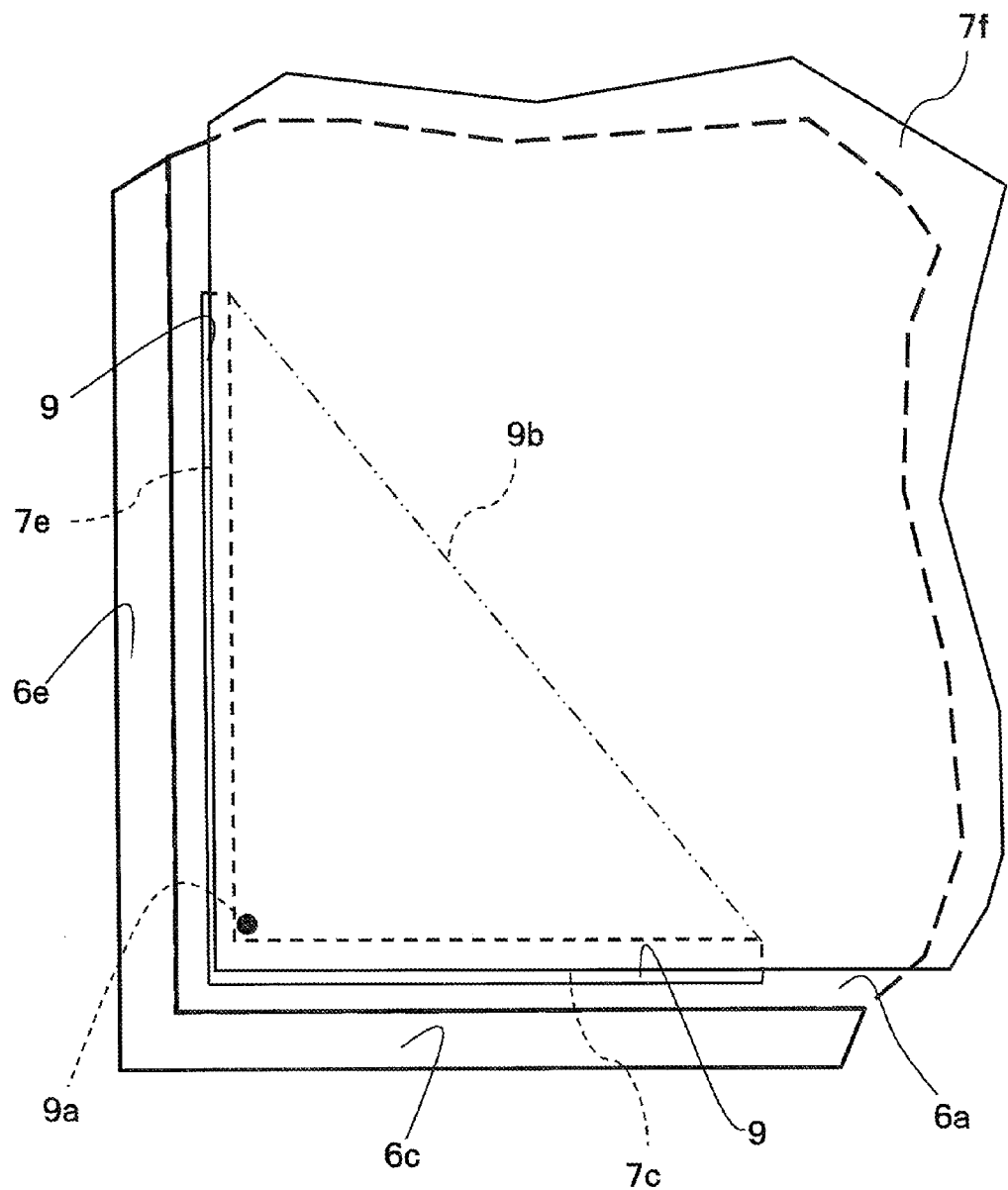
FIG. 5 is a relevant part plan view in which the HDD is housed in another hard disk case.

The basic shape of the HDD 7 housed in the case 6 is generally a rectangular parallelepiped, and the shape of the lower principal surface 6a is basically also a rectangle. FIG. 5 shows a state where a plan view in which adjoining slit openings form an interior angle α of 90 degrees is viewed from the top surface 7f of the HDD 7. It should be noted that, since the configuration of the case 6 in the present embodiment is similar to that shown in FIG. 4A to FIG. 4C except for slit openings 9, details of the configuration are omitted. The slit openings 9 are formed parallel with respect to each of the lateral walls forming the case 6. The slit openings 9 are formed on the lower principal surface 6a at each of the corner parts such that, along the below-electrode lateral wall 6b and the opposing lower lateral wall 6c, the slit openings 9 have a width of 1 mm, an outer length of 25 mm, and a separation of 1 mm from each of the lateral walls. The slit openings 9 are formed on the lower principal surface 6a at each of the corner parts such that, along the lower right lateral wall 6d and the lower left lateral wall 6e, the slit openings 9 have a width of 1 mm, an outer length of 20 mm, and a separation of 1 mm from each of the lateral walls. Since the two portions of the slit opening 9 are connected at a corner part of the lower principal surface 6a, for example, at a corner part formed by the opposing lower lateral wall 6c and the lower left lateral wall 6e, an angle part 9a deforms in the obverse-reverse surface directions using an axis 9b as a center. Furthermore, similar to the previously described embodiment, when the HDD 7 is housed in the case 6, the HDD 7 is disposed over the voids of the slit openings 9.

Figure 6:
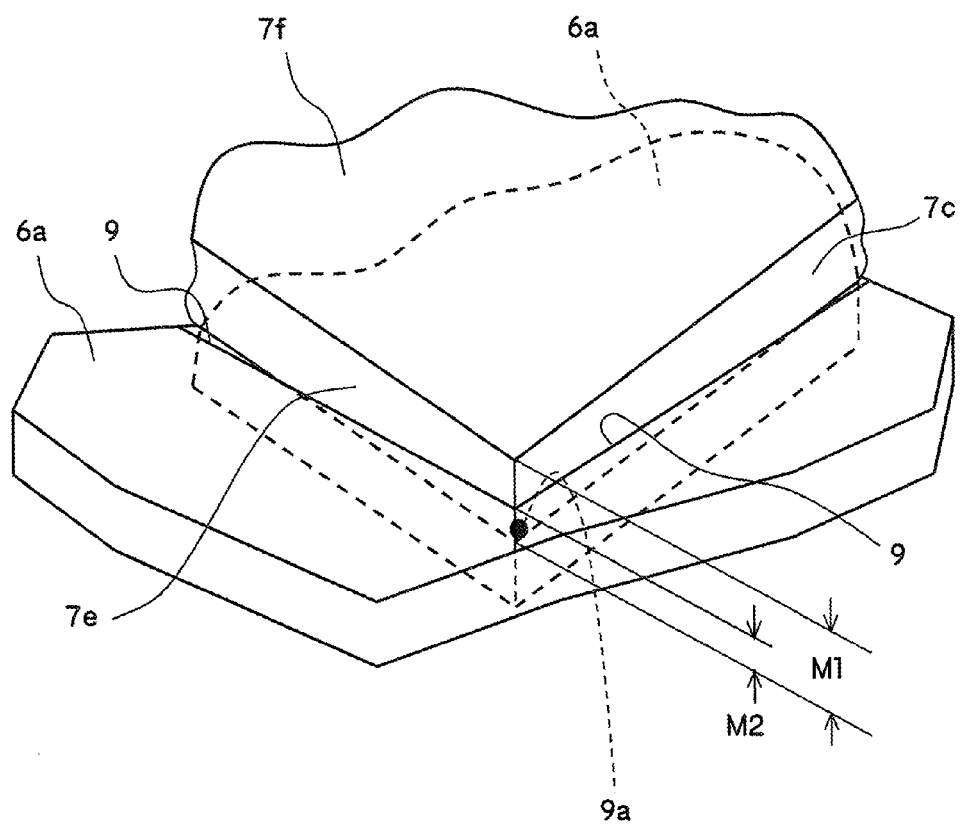
FIG. 6 is a perspective view of FIG. 5.

When the case 6 housing the HDD 7 is subjected to external disturbance in a direction orthogonal to the lower principal surface 6a, vibration is generated in the obverse-reverse surface directions of the HDD 7 due to an impact generated by the external disturbance. The manner how the impact is reduced by the vibration will be described with reference to a partial enlarged perspective view shown in FIG. 6. The HDD 7 is disposed over the voids of the slit openings 9. Therefore, the corners formed by the four lateral surfaces of the bottom surface 7a forming each of the angle parts of the HDD 7 fit within areas surrounded by boundaries of the slit openings 9. Thus, the angle part of the HDD 7 formed by the left lateral surface 7e and the opposing lateral surface 7c is supported by the angle part 9a of the slit openings 9 formed on the lower principal surface 6a. An impact to the HDD 7 caused by external disturbance is reduced by elastic deformation of the angle part 9a at the axis 9b in up-down directions (cf. FIG. 5). Thus, an impact can be reduced by having the angle part 9a in FIG. 5 move up and down (only the downward direction is diagrammatically shown) using the axis 9b as a center to cause elastic deformation of the angle part 9a at the slit opening 9 such that a thickness M1 in the HDD 7 becomes M2. Therefore, the thickness of the case 6 can be reduced while improving shock resistance of the PC having the case 6 built therein.

Although the slit openings 9 of the present embodiment are formed separate from adjacent lateral walls (e.g., the opposing lower lateral wall 6c and the lower left lateral wall 6e) by the closest distance (e.g., 1 mm), such a configuration is merely one example. It is possible to set the closest distance to zero the and arrange the outer side of the slit opening 9 at boundary portions of the lower principal surface 6a and lateral walls. With this configuration, the area size of the lower principal surface 6a can be reduced, and the size the case 6 can be reduced.

Furthermore, although a configuration in which the HDD 7 is housed in the case 6 is described in the present embodiment, for example, lateral surface buffer materials may be disposed between the four lateral surfaces of the HDD and the four lateral walls of the case 6 for suppressing shaking of the HDD 7 in the case 6.

Furthermore, although the thickness of the lower principal surface 6a is set to 1 mm such that an impact generated by external disturbance is reduced through bending of the angle part 9a using the axis 9b as a center, such a configuration is merely one example. For example, since reducing the thickness improves impact-reducing performance, the thickness may be set as thin as 0.5 mm. With this, even though there is a trade-off between improvement of impact-reducing performance and the strength of the case 6 itself, it is possible to set the thickness so as to be able to maintain the strength of the case 6. Having a large length for the slit opening 9 included on the lower principal surface 6a along a lateral wall (e.g., the opposing lower lateral wall 6c) improves impact-reducing performance. However, when the length of the slit opening 9 is too large, the distance from an adjacent slit opening 9 may become too small and strength of the lower principal surface 6a at a location between adjacent slit openings 9 may become insufficient. Therefore, the length of the slit opening 9 is set in accordance with the length of the corresponding case 6.

In the present embodiment, although the corner formed by lateral surfaces of the HDD is 90 degrees whereas an angle formed by the slit opening is 100 degrees, the angle of the slit opening is not limited thereto as long as the angle is formed so as to surround the corner formed by lateral surfaces of the HDD. Furthermore, one or all part of the slit opening may be formed as a curve.

[2-1. Configuration of Hard Disk Drive]

Figure 7:
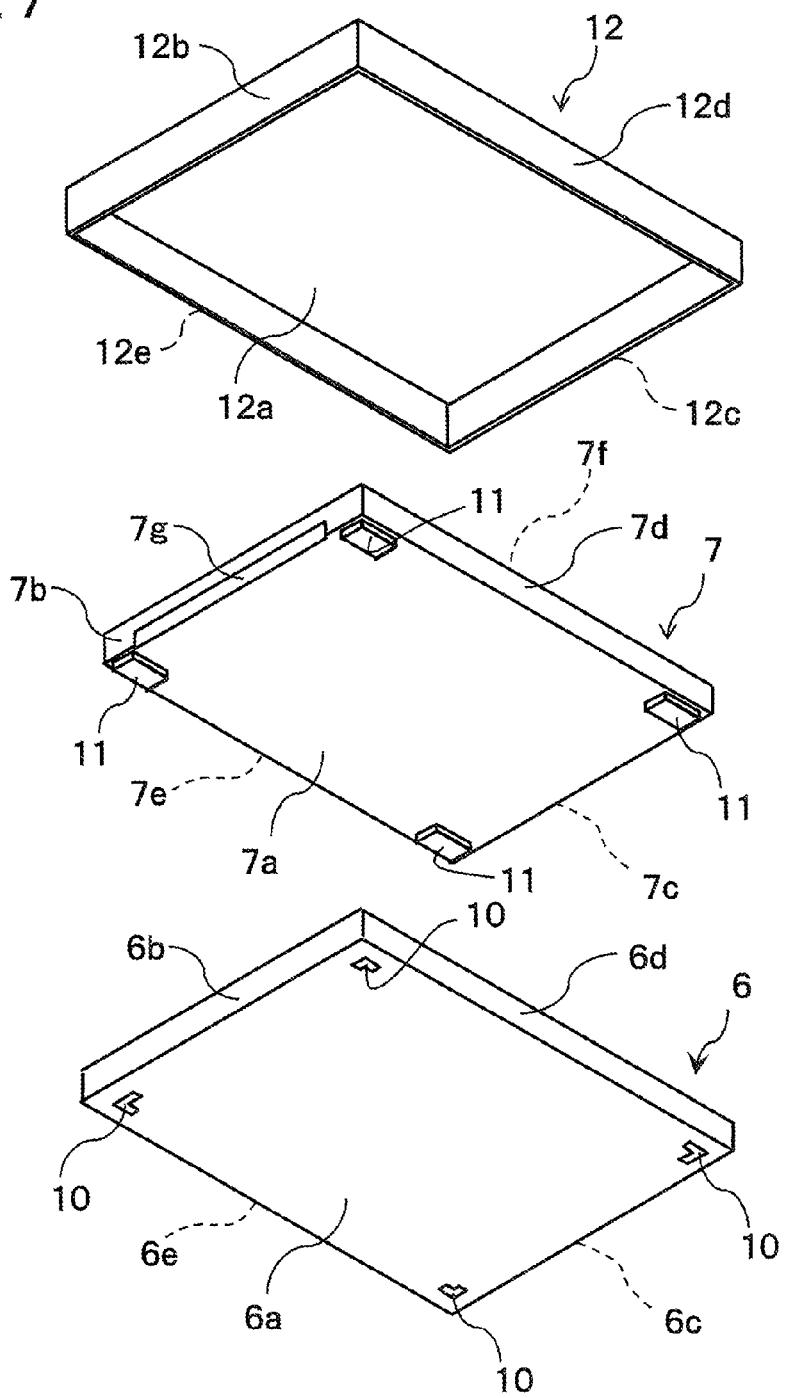
FIG. 7 is an exploded perspective view of another hard disk case built in a PC.

FIG. 7 is an exploded perspective view of the case 6 housing the HDD 7. The HDD 7 has the bottom surface 7a, the electrode-side lateral surface 7b where the electrode 7g is arranged, the opposing lower lateral surface 7c opposing the electrode-side lateral surface 7b through the read/write head and the storage disk built in the HDD 7, the right lateral surface 7d and the left lateral surface 7e which are respectively on the right side and the left side when viewed from the electrode-side lateral surface, and the top surface 7f opposing the bottom surface 7a through the disk and read/write head. In addition, lower buffer materials 11 are arranged at the bottom of the bottom surface 7a. The lower buffer materials 11 are arranged with respect to the HDD 7 so as to each be in the inner side of the HDD 7 by 1 mm from the electrode-side lateral surface 7b, the opposing lateral surface 7c, the right lateral surface 7d, and the left lateral surface 7e. In addition, examples of the lower buffer materials 11 include rubbers such as ethylene-propylene rubbers and fluorocarbon rubbers, and foams obtained by foaming urethane, polyethylene, or the like. Furthermore, instead of using the lower buffer materials 11 by themselves, a composite buffer material may be used as the lower buffer materials 11 of the present embodiment; and examples thereof include a composite buffer material of a vibration damping part and an impact-absorbing part disclosed in Japanese Laid-Open Patent Publication No. 2009-264483, a composite buffer material obtained by embedding in a flexible material a cut end surface of a plate-like member disclosed in Japanese Laid-Open Patent Publication No. 2004-315087, Japanese Laid-Open Patent Publication No. 2008-291986, etc., and the like. In the present embodiment, a urethane foam having a length of 2.5 mm in the long side direction (i.e., direction of the right lateral surface 7d and left lateral surface 7e), a length of 2.2 mm in the short side direction (i.e., direction of the electrode-side lateral surface 7b and the opposing lateral surface 7c) of the HDD 7, and a height of 7.5 mm in natural length is used.

In addition, the HDD 7 is attached firmly to the lower principal surface 6a of the case 6 to be housed therein. The case 6 has the lower principal surface 6a described above, the below-electrode lateral wall 6b on a side of the electrode-side lateral surface 7b, the opposing lower lateral wall 6c on a side of the opposing lateral surface 7c, and the lower right lateral wall 6d and the lower left lateral wall 6e that are respectively on sides of the right lateral surface 7d and the left lateral surface 7e. It should be noted that, as a material for the case 6 of the present embodiment, a flexible acrylonitrile-styrene copolymer resin is used. In addition, at four locations in the vicinity of corner parts of the lower principal surface 6a of the case 6, slit openings 10 that penetrate the lower principal surface 6a are formed.

Furthermore, in the present embodiment, an upper hard disk case (hereinafter, abbreviated as upper case) 12 that fits the case 6 is also provided. The upper case 12 includes an upper principal surface 12a opposing the lower principal surface 6a through the HDD 7, an above-electrode lateral wall 12b that engages the below-electrode lateral wall 6b, an opposing upper lateral wall 12c that engages the opposing lower lateral wall 6c, an upper right lateral wall 12d that engages the lower right lateral wall 6d, and an upper left lateral wall 12e that engages the lower left lateral wall 6e. In addition, the case 6 and the upper case 12 are fixed to each other by, for example, an engagement of an engagement hole included in the lower right lateral wall 6d and a protrusion included in the upper right lateral wall 12d, and an engagement of an engagement hole included in the lower left lateral wall 6e and a protrusion included in the upper left lateral wall 12e. It should be noted that, as a material for the upper case 12 of the present embodiment, an acrylonitrile-styrene copolymer resin similar to that for the case 6 is used.

When the case 6 and the upper case 12 are fixed to each other having the HDD 7 interposed therebetween, in order to cool the heat generate by the HDD 7 during operation, for example, it is possible to adopt a configuration with a penetration hole formed on the upper principal surface 12a, a configuration in which the upper case 12 is formed with a material having excellent thermal conductivity such as aluminum or the like, or a configuration combining those.

In addition, if the slit openings 10 are formed on the upper principal surface 12a of the upper case 12 in a manner similar to the lower principal surface 6a, an impact applied to the HDD 7 can be reduced.

[2-2. Buffer Configuration of Hard Disk Drive]

Figure 8:
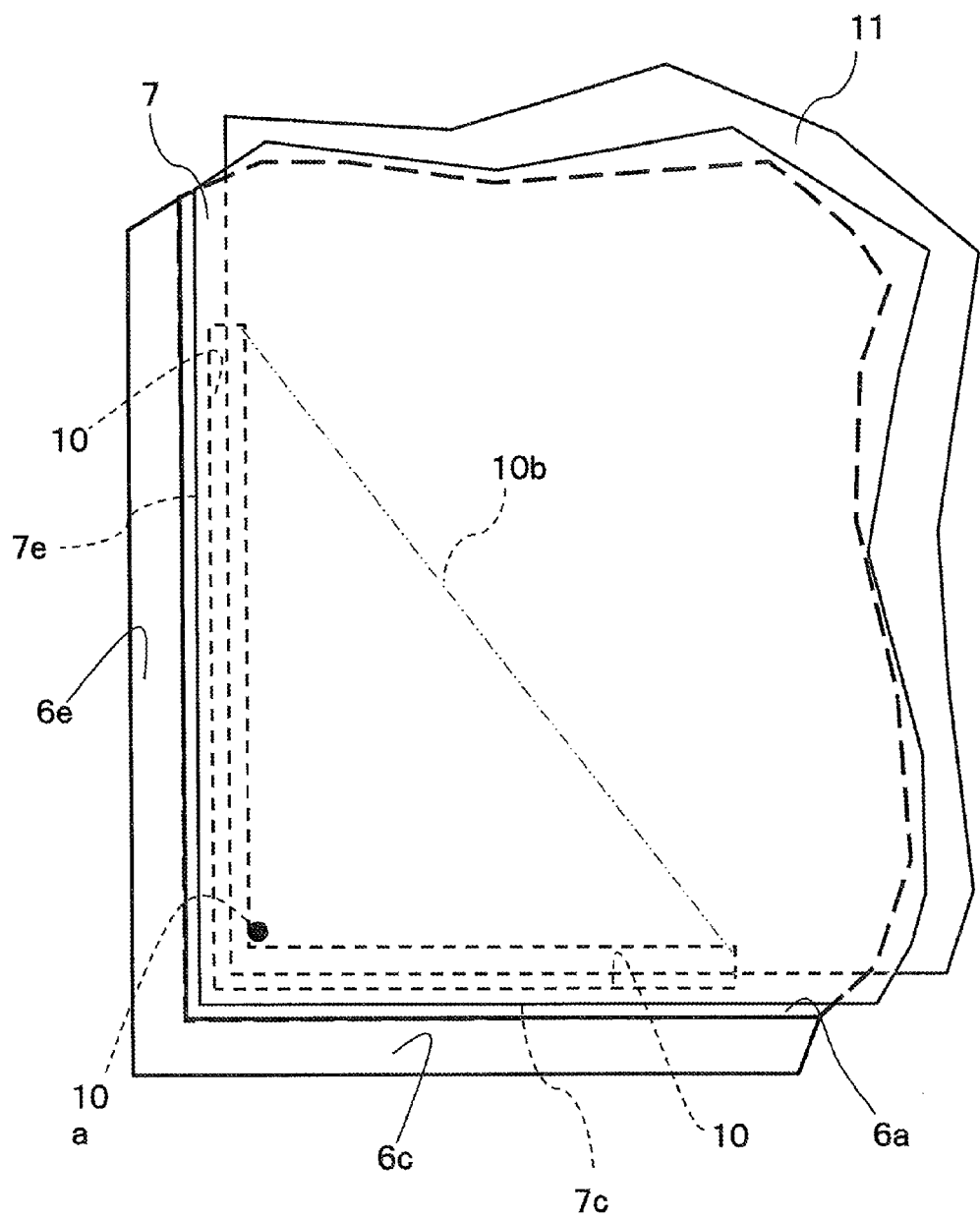
FIG. 8 is a relevant part plan view in which the HDD in FIG. 7 is housed in the hard disk case.

FIG. 8 shows a state where a plan view in which the HDD 7 is housed in the case 6 having the lower buffer materials 11 is viewed from the top surface 7f of the HDD 7. It should be noted that, since the configuration of the case 6 in the present embodiment is similar to that shown in FIG. 5 including the slit openings 10, details of the configuration are omitted. The slit openings 10 are formed on the lower principal surface 6a at each of the corner parts such that, along the below-electrode lateral wall 6b and the opposing lower lateral wall 6c, the slit openings 10 have a width of 1 mm, an outer length of 25 mm, and a separation of 1 mm from each of the lateral walls. The slit openings 10 are formed on the lower principal surface 6a at each of the corner parts such that, along the lower right lateral wall 6d and the lower left lateral wall 6e, the slit openings 10 have a width of 1 mm, an outer length of 20 mm, and a separation of 1 mm from each of the lateral walls. Since the two portions of the slit opening 10 are connected at a corner part of the lower principal surface 6a, for example, at a corner part formed by the opposing lower lateral wall 6c and the lower left lateral wall 6e, an angle part 10a deforms in the obverse-reverse surface directions using an axis 10b as a center. In addition, when the HDD 7 is housed in the case 6, as shown in FIG. 8, the HDD 7 is arranged between each of the outer sides of the slit openings 10 and each of the lateral walls of the case 6 (e.g., between the opposing lower lateral wall 6c and an outer side of the slit opening 10). Furthermore, the above-electrode lateral wall 12b, the opposing upper lateral wall 12c, the upper right lateral wall 12d, and the upper left lateral wall 12e of the upper case 12 are each arranged within gaps formed between the HDD 7 and each of the lateral walls of the case 6 when the upper case 12 engages the case 6. Further, as shown in FIG. 8, one portion of each of the lower buffer materials 11 is disposed in one of the slit openings 10 of the case 6.

When the case 6 housing the HDD 7 is subjected to external disturbance in a direction orthogonal to the lower principal surface 6a, vibration is generated in the obverse-reverse surface directions of the HDD 7 due to an impact generated by the external disturbance. The reduction of the impact by the vibration will be described with reference to a partial enlarged perspective view shown in FIG. 9.

Figure 9:
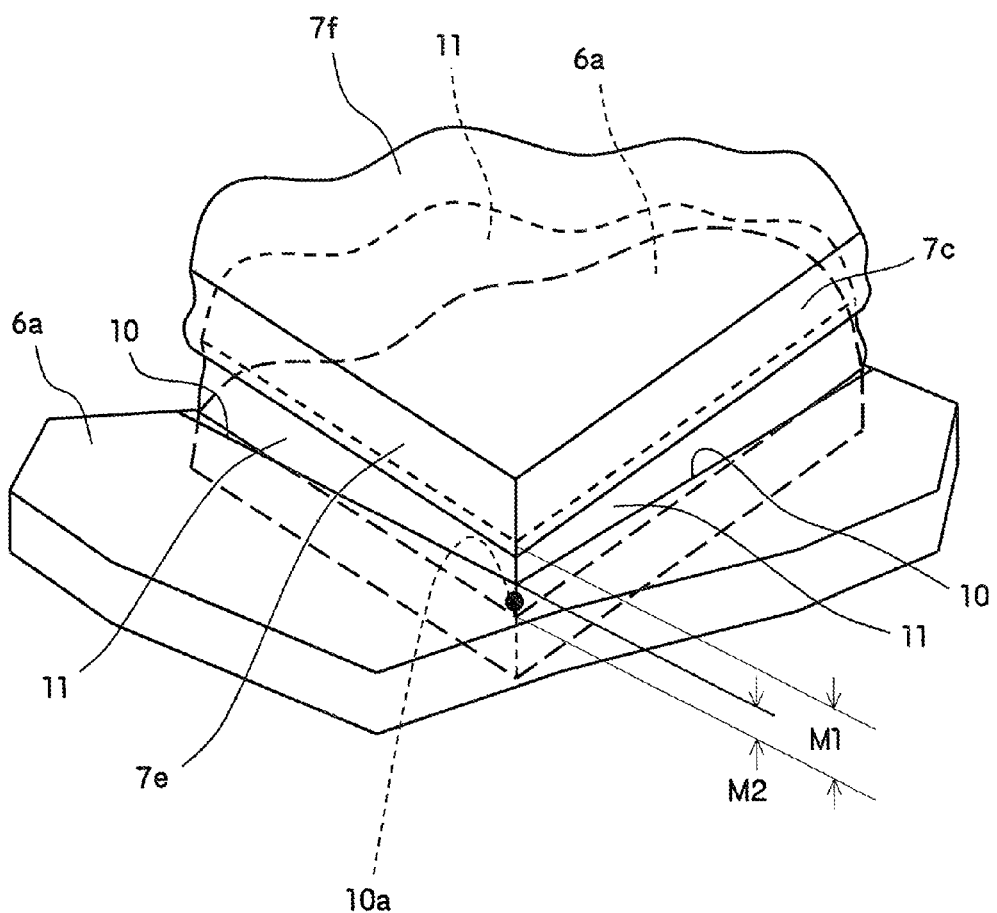
FIG. 9 is a perspective view of FIG. 8.

The lower buffer materials 11 of the HDD 7 are disposed over the voids of the slit openings 10. In addition, the lower buffer materials 11 of the HDD Tare disposed on each of the angle parts (e.g., 10a) of the slit openings 10 formed on the lower principal surface 6a. Thus, an angle part of the lower buffer materials 11 along the left lateral surface 7e and the opposing lateral surface 7c is supported by the angle part 10a of the slit opening 10 formed on the lower principal surface 6a, and an impact to the HDD 7 caused by external disturbance is reduced in accordance with elastic deformation of the angle part 10a at the axis 10b (cf. FIG. 8) in up-down directions and with contraction and expansion motions of the lower buffer materials 11. Thus, an impact can be reduced by having the angle part 10a in FIG. 8 move in obverse-reverse surface directions (only the reverse surface direction is diagrammatically shown) using the axis 10b as a center, and by having the lower buffer materials 11 contract or expand (only a contraction is diagrammatically shown) to cause elastic deformation of the angle part 10a using the axis 10b as a center such that a thickness M1 of the lower buffer materials 11 becomes M2 as shown in FIG. 9. Therefore, the thickness of the case 6 can be reduced while improving shock resistance of the PC having the case 6 built therein. It should be noted that, due to compressive deformation of the lower buffer materials 11, M1 in FIG. 9 is different from the thickness of the lower buffer materials 11 housed in the case 6 and the upper case 12.

Although the slit openings 10 of the present embodiment are formed separate from adjacent lateral walls (e.g., the opposing lower lateral wall 6c and the lower left lateral wall 6e) by the closest distance (e.g., 1 mm), such a configuration is merely one example. It is possible to set the closest distance to zero and arrange the outer sides of the slit openings 10 at boundary portions of the lower principal surface 6a and lateral walls, leaving the gaps having a thickness (e.g., 0.5 mm) of each of the lateral walls of the upper case 12. With this configuration, the area size of the lower principal surface 6a can be reduced, and the size the case 6 can be reduced.

Furthermore, although a configuration in which the HDD 7 is housed in the case 6 is described in the present embodiment, for example, lateral surface buffer materials may be disposed between the four lateral surfaces of the HDD and the four lateral walls of the case 6 for suppressing shaking of the HDD 7 in the case 6.

Furthermore, although the thickness of the lower principal surface 6a is set to 1 mm such that an impact generated by external disturbance is reduced through bending of the angle part 10a using the axis 10b as a center, such a configuration is merely one example. For example, since reducing the thickness improves impact-reducing performance, the thickness may be set as thin as 0.5 mm. With this, even though there is a trade-off between improvement of impact-reducing performance and the strength of the case 6 itself, it is possible to set the thickness so as to be able to maintain the strength of the case 6. Having a large length for the slit opening 10 included on the lower principal surface 6a along a lateral wall (e.g., the opposing lower lateral wall 6c) improves impact-reducing performance. However, when the length of the slit opening 10 is too large, the distance from an adjacent slit opening 10 may become too small and strength of the lower principal surface 6a at a location between adjacent slit openings 10 may become insufficient. Therefore, the length of the slit opening 10 is set in accordance with the length of the corresponding case 6.

In addition, as shown in FIG. 10, upper buffer materials 13 may be arranged between the upper principal surface 7f of the HDD 7 and the upper principal surface of the upper case 12. FIG. 9 is a perspective view showing in an enlarged manner relevant parts of FIG. 10. The upper buffer materials 13 may be formed using the material used for the lower buffer materials 11 or the like. Furthermore, the upper buffer materials 13 may be similar to the lower buffer materials 11 included in the HDD 7 in terms of their arrangement positions and their thickness, or may have a smaller volume (e.g., having a length of 2 mm along the long side direction of the HDD 7, a length of 1.5 mm along the short side direction of the HDD 7, and a thickness of 3 mm in natural length) than the lower buffer materials 11. When the upper buffer materials 13 are disposed on the top surface 7f of the HDD 7 along the angle parts 10a of the slit openings 10, reduction of vibration applied the HDD 7 and the buffer materials 11 can be improved through pressure generated by the upper buffer materials 13 in the up-down directions.

Furthermore, although the upper principal surface 12a shown in FIG. 7 has a flat plate-like shape, the upper principal surface 12a may also have slit openings in the vicinity of each of the four angle parts in a manner similar to the lower principal surface 6a. When the upper principal surface 12a has slit openings, vibration applied to the HDD 7 can be reduced in a manner similar to that by the slit openings 10 of the lower principal surface 6a.

As presented above, embodiments has been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An electronic apparatus comprising:
   an electronic component; and
   a case housing the electronic component, wherein
   the case comprises a lower member that supports the electronic component, the lower member having a corner portion defined by first and second adjacent sides of the case,
   the corner portion of the lower member comprises a first slit along the first side and a second slit along the second side,
   the first slit and the second slit connect to each other at the corner portion, and form a penetration hole that extends completely through the lower member, and
   an inner area of the corner portion of the lower member, that is inward of the penetration hole and bounded by the penetration hole, contacts with and supports a corner portion of a lower surface of the electronic component.

2. The electronic apparatus according to claim 1, further comprising a buffer material provided between the inner area and a lower surface of the electronic component.

3. The electronic apparatus according to claim 1, wherein
   a lower surface of the electronic component has a rectangular shape,
   the lower member has four corner portions,
   a plurality of the penetration holes are formed by corresponding ones of the first slits and the second slits, one for each of the four corner portions of the lower member, and
   the inward area at each of the four corner portions of the lower member contacts with and supports one of the corner portions of the lower surface of the electronic component.

4. The electronic apparatus according to claim 1, wherein an angle between the first slit and the second slit is greater than or equal to an angle of the corner portion of a lower surface of the electronic component.

5. The electronic apparatus according to claim 1, wherein the lower member in the inward area is elastically deformed downwardly.

6. The electronic apparatus according to claim 5, wherein the inward area is an area surrounded by the first slit, the second slit, and a straight line connecting between an end of the first slit on a side opposite to the corner side of the corner portion and an end of the second slit on a side opposite to the corner side of the corner portion.

7. The electronic apparatus according to claim 1, wherein the corner portion of the electronic component is positioned between the penetration hole and the inward area.

8. The electronic apparatus according to claim 1, wherein an area of the lower member outward of the penetration hole does not contact with the corner portion of the electronic component.

9. The electronic apparatus according to claim 1, wherein two sides defining the corner portion of the electronic component are positioned immediately above the penetration hole.

10. The electronic apparatus according to claim 1, wherein the electronic component is a hard disk drive.

11. A case for an electronic component, comprising:
    a lower member having a corner defined by first and second adjacent sides of the case, wherein
    the corner portion of the lower member comprises a first slit along the first side and a second slit along the second side,
    the first slit and the second slit connect to each other at the corner portion, and form a penetration hole that extend completely through the lower member, and
    an inner area of the corner portion of the lower member, that is inward of the penetration hole and bounded by the penetration hole, contacts with and supports a corner portion of a lower surface of an electronic component housed by the case.

* * * * *